Dec. 12, 1972 B. SALVERT 3,706,045

METHOD AND A DEVICE FOR ELIMINATING THE NOISE IN A TRANSMISSION CHAIN OF RADIO-ELECTRIC SIGNALS

Filed April 12, 1971 2 Sheets-Sheet 1

Bernard Salvert
Inventor.

By Karl F. Ross
Attorney

Bernard Salvert
Inventor.

By Karl F. Ross
Attorney 3,706,045

METHOD AND A DEVICE FOR ELIMINATING THE NOISE IN A TRANSMISSION CHAIN OF RADIO-ELECTRIC SIGNALS

Bernard Salvert, Villejuif, France, assignor to Electronique Marcel Dassault, Paris, France Filed Apr. 12, 1971, Ser. No. 132,983
Claims priority, application France, Apr. 17, 1970, 7014004
Int. Cl. H03k *5/00*
U.S. Cl. 328—165 10 Claims

ABSTRACT OF THE DISCLOSURE

A method and a device for eliminating the noise in a network traversed by radio-electric signals, such as a receiving channel, are described. The signals received are fed to a threshold amplifier via a first line and to a gate via on a second line, the output of the amplifier being applied to the gate to generate at the output thereof a signal which is representative of the noise only and which is applied to the amplifier as a control factor therefor.

My present invention relates to the processing of electromagnetic signals, in particular in a receiving channel or line.

As a general rule, electrical signals propagated along a transmission path are accompanied by noise, i.e. the voltage transmitted not only carries the useful signals but also undergoes amplitude changes of greater or lesser magnitude and commonly of transient nature, generated either by extraneous transmission or within the reception line itself.

To suppress or attenuate the noise, devices have been proposed which are based on the premise that the signal to be transmitted has a greater amplitude—in principle—than the noise; these devices are therefore arranged to suppress amplitudes lower than a predetermined minimum value or threshold.

For the purpose of adapting a receiving channel or line to different transmission conditions, it has been proposed to modify the level of the threshold and thus to retain satisfactory sensitivity for the system.

In some devices, this modification is controlled manually.

In other devices, it is controlled in automatic manner, the control factor then consisting of the mean amplitude of the signal received.

In conventional devices of this type, the signal received—apart from being applied to a threshold amplifier—is fed along a second line or channel into an integrator whose output controls the level of the threshold.

The results are not fully satisfactory in many cases. For example, if the amplitude of a useful signal received is relatively great in comparison with the mean noise amplitude, the level of the threshold is unduly high, which prevents reception of other useful signals of lesser amplitude than the first signal but nevertheless higher than the mean amplitude of the noise.

Equally, in case of transmission jamming, the jamming signals raise the threshold level to a value which may be higher than that of the amplitude of the signals whose reception is desirable.

The invention is based on the principle of controlling the threshold level not as a function of the mean energy of the combination of the signals transmitted, but as a function of the mean energy of the noise alone.

The threshold level can thus follow the noise variations in which more precise manner, and the sensitivity of the system is greater.

It is thereby possible to detect useful signal whose amplitude is little higher than that of the noise.

The result of a jamming action is therefore minimized.

According to a more particular feature of my invention, the controlling parameter for the threshold level is provided by a branch channel or line comprising an electronic gate which closes under the control of the signal supplied by the threshold amplifier.

An embodiment of my invention will now be described, by way of example, with reference to the accompanying drawing, in which.

Figure 1:
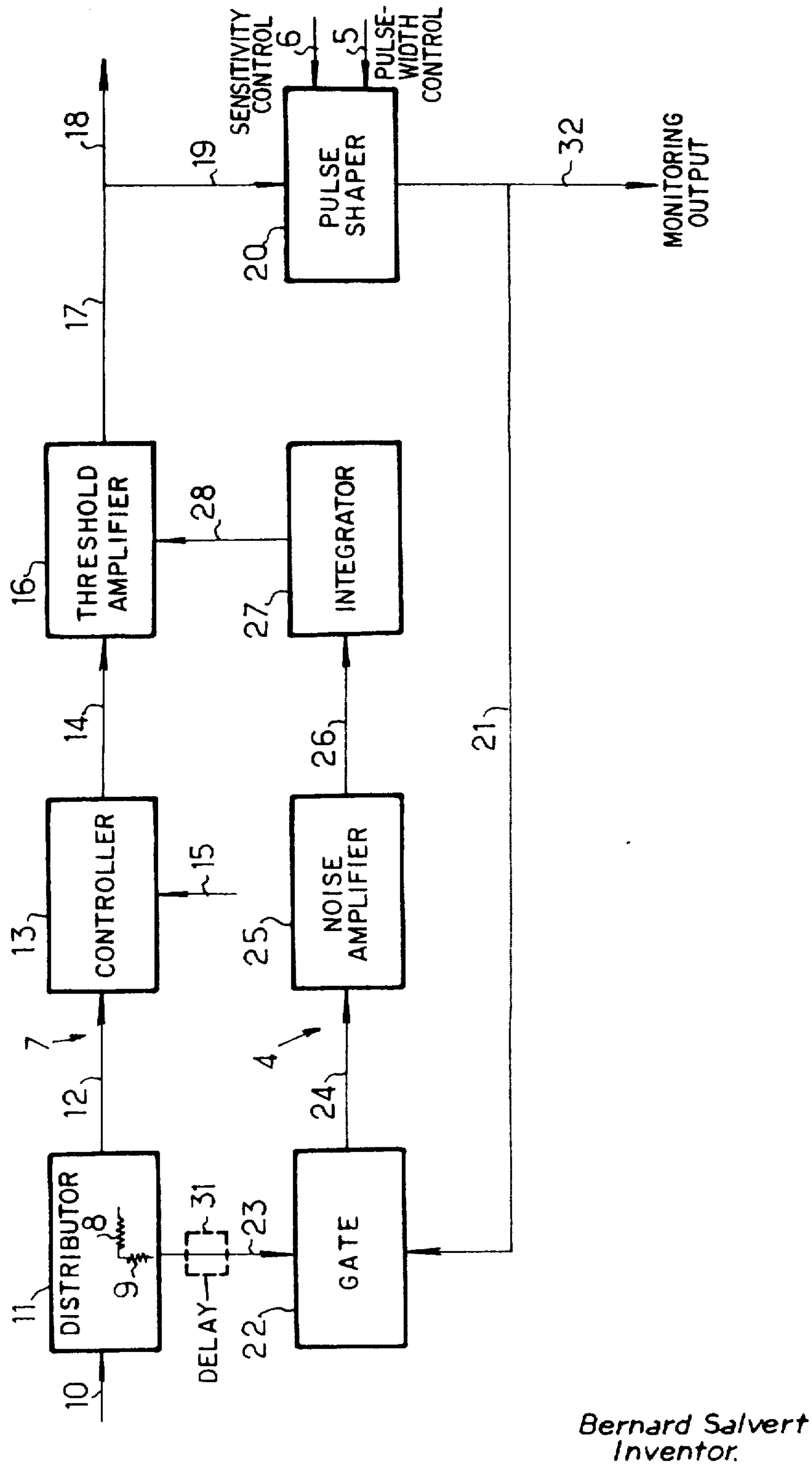
FIG. 1 is a block diagram of a signal receiver according to the invention.
Figure 2:
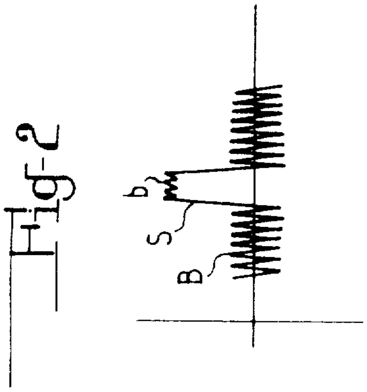

The input 10 (FIG. 1) of the receiver feeds a distributor 11, consisting of two resistors 8 and 9 in the simplest cases. The incoming signal wave comprises the useful message signals, consisting of a recurrent or nonrecurrent series of pulses, and the accompanying noise, as shown schematically in the diagram of FIG. 2 in which the useful signal is the pulse S of greater amplitude than the noise indicated schematically by the line B, the signal S may itself be modulated by noise as shown schematically at *b*.

Figure 3:
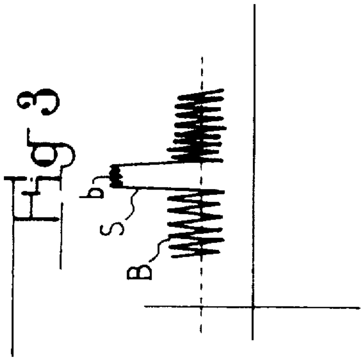

The first output terminal 12 of the distributor 11 feeds a control device 13, forming part of a first line or channel 7, with the signal present at the input terminal 10; and at the output terminal 14 of the device 13 there is present a signal as shown on the diagram of FIG. 3, which is a replica of the signal at the input terminal 12 but with a constant voltage difference whose value depends on an adjusting potential applied to a second input terminal 15 of the device 13.

Figure 4:
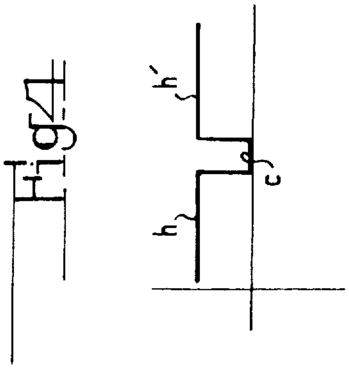
FIGS. 2 to 6 are diagrams of signals.

The output terminal 14 of the device 13 feeds a threshold amplifier 16 whose output lead 17 comprises a first branch 18, which represents the load terminal of the receiver and a second branch 19 forming the input of a pulse shaper 20 which, upon receiving a signal S, delivers a rectangular voltage pulse *c* as shown in FIG. 4. Means shown at 6 make it possible to control the device 20, which may be of the logical type, to trigger the forming of the pulse when the signal voltage on the output lead 17 exceeds a predetermined value, thus allowing an adjustment of sensitivity. Means shown at 5 make it possible to vary the width of the pulse *c*.

This pulse *c*, through a conductor 21, controls the closing of an electronic gate 22 interposed in a second line or channel 4 which is fed by an output lead 23 of the distributor 11. Channel 4 is continued beyond the output lead 24 of the gate 22 by an amplifier 25 connected to an output lead 26 to an integrator 27 whose output on a lead 28 controls the threshold level of the amplifier 16.

Figure 5:
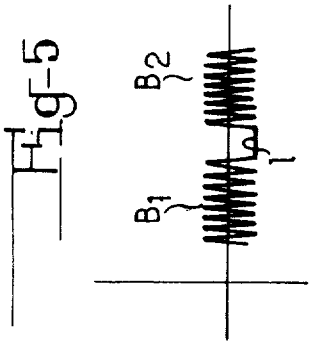

The gate 22 remains unblocked as long as the output of the pulse shaper 20 corresponds to a level *h* distinct from the pulse *c*. When this negative pulse appears in the output of the shaper, it blocks the gate 22 which transmitted the noise $B_1$ as shown by the horizontal portion *l* of the diagram of FIG. 5. Accordingly, the gate 22 does not transmit anything at the instant of reception of the useful signal S which represents the control factor for the device 20 generating the pulse *c*. After the pulse *c* has terminated; i.e. when the voltage on the line 21 resumes its initial value as shown by the horizontal line *h'*, in FIG. 4 the gate 22 is unblocked and the noise is transmitted again as shown at $B_2$ in FIG. 5.

This stepped voltage, in magnified form, is present on the output lead 26 of the amplifier 25 which, at its input, receives only the voltage representing the noise, excluding that which represents the message signal, and which is thus a noise-amplifier.

The output voltage of the noise-amplifier 25 is fed to the integrator 27 and the threshold-modifying voltage in the output 28 of the integrator thus depends solely on the mean noise voltage, so that the level of the threshold of the amplifier 16 is controlled in a manner known per se as a function of the mean noise voltage minus the useful signals.

Figure 6:
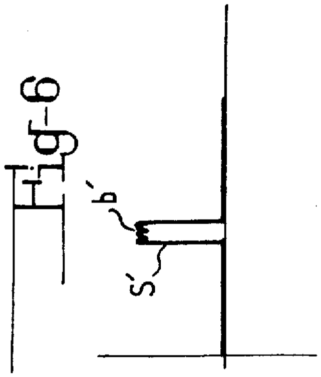

The voltage present at the output of the amplifier 16 is shown in the diagram of FIG. 6. The noise is practically eliminated, except for the superimposed ripple *b'* which may effect the signal itself and which is not troublesome.

Since the noise without the signal is the control factor for the level of the threshold of the amplifier 16, the controlled level follows the mean voltage of the noise as closely as desired without being affected by the amplitude of the message signals. It is thus possible to receive not only a signal of large amplitude but also signals of lesser amplitude close to that of the noise.

Jamming or interference signals, even those of great amplitude, do not unduly raise the threshold level of the amplifier 16.

A delay device introducing a short time lag may be incorporated in the lead 23, as shown at 31 by a dashed line, so that the blocking of the gate 22 by the pulse *c* on lead 20 coincides precisely with the appearance of the signal pulse S.

The existence of the ancillary loop 4, comprising the electronic gate 22 and the noise amplifier 25, does not diminish the sensitivity of the receiver proper. In the case of a signal of the same order of magnitude as the noise, the gate 22 is not blocked so that the useful signal appears at the output 18.

By adjusting the width of the pulse, it is possible to block the gate 22 (if desired) for a period exceeding that of the useful signal to suppress the superimposed oscillations which could affect the adjustment of the threshold level of the amplifier 16.

Such an adjustment may be made by selecting a suitable value for the voltage applied to the input terminal 15 of the control device 13, thus making it possible to set the minimum level of the signal to be extracted.

An ancillary output lead 32 may be branched off the line to monitor the presence of the rectangular pulse characteristic of a useful signal.

In some instances, the threshold amplifier 16 may directly deliver a rectangular signal exploitable without a pulse shaper for the blocking of the electronic gate.

The system according to the invention may also be used for example to operate an automatic-gain control device, based on amplification of the noise alone which is characteristic of the gain; the influence of the useful signal to be amplified, which is of varying magnitude, is thereby eliminated.

A network such as that described, inserted in the output of a video receiver with a 12-mHz band, has been realized with an integrated amplifier and an integrated monostable element. The servo-control of the noise threshold is such that, within a temperature range extending from $-35°$ to $+70°$ C., the signal/noise ($S/B$) ratio required to produce a noise-free output signal does not vary by more than 2 db irrespective of the amplitude of the noise.

What is claimed is:

1. A system for suppressing noise accompanying electrical message signals traveling along a transmission path, comprising:

distributing means for directing an incoming signal wave onto a first and second channel in parallel;

amplifier means in said first channel having an adjustable threshold for signal voltages to be amplified, said amplifier means being provided with a control input for varying said threshold;

gate means in said second channel for selectively blocking the passage of message signals thereover;

integrating means in said second channel beyond said gate means for feeding to said control input a threshold-modifying voltage proportional to the mean of noise voltages traversing said gate means; and circuitry including a pulse shaper connected between an output of said amplifier means and said gate means for blocking the latter in the presence of message signals cleaning said threshold, said pulse shaper being provided with a monitoring output energized in the presence of message signals and with pulse-width-control means for broadening a blocking pulse issuing therefrom.

2. A system as defined in claim 1, further comprising delay means inserted in said second channel ahead of said gate means for timing the arrival of message signals at said gate means to coincide with a blocking pulse from said pulse shaper.

3. A system as defined in claim 1, further comprising a noise amplifier inserted in said second channel between said gate means and said integrating means.

4. A system as defined in claim 1, further comprising amplitude-control means inserted in said first channel between said distributing means and said amplifier means.

5. A system as defined in claim 1 wherein said pulse shaper is provided with sensitivity-control means.

6. A system for suppressing noise accompanying electrical message signals traveling along a transmission path, comprising:

distributing means for directing an incoming signal wave onto a first and a second channel in parallel;

amplifier means in said first channel having an adjustable threshold for signal voltages to be amplified, said amplifier means being provided with a control input for varying said threshold;

gate means in said second channel for selectively blocking the passage of message signals thereover;

integrating means in said second channel beyond said gate means for feeding to said control input a threshold-modifying voltage proportional to the mean of noise voltages traversing said gate means;

circuitry including a pulse shaper connected between an output of said amplifier means and said gate means for blocking the latter in the presence of message signals clearing said threshold, said pulse shaper being provided with a monitoring output energized in the presence of message signals; and delay means inserted in said second channel ahead of said gate means for timing the arrival of message signals at said gate means to coincide with a blocking pulse from said pulse shaper.

7. A system as defined in claim 6, further comprising a noise amplifier inserted in said second channel between said gate means and said integrating means.

8. A system as defined in claim 6, further comprising amplitude-control means inserted in said first channel between said distributing means and said amplifier means.

9. A system as defined in claim 6 wherein said pulse shaper is provided with sensitivity-control means.

10. A system as defined in claim 6 wherein said pulse shaper is provided with pulse-width-control means for broadening a blocking pulse issuing therefrom.

References Cited

UNITED STATES PATENTS

| | | | |
|---|---|---|---|
| 3,387,222 | 6/1968 | Helwarth | 307—235 |
| 3,548,206 | 12/1970 | Ogle et al. | 328—165 |
| 2,710,347 | 6/1955 | Brady | 328—165 |
| 3,094,665 | 6/1963 | Wildman | 328—165 |
| 3,128,435 | 4 1964 | Mleczko et al. | 328—115 |
| 3,076,145 | 1/1963 | Copeland | 328—117 |

JAMES W. LAWRENCE, Primary Examiner

H. A. DIXON, Assistant Examiner

U.S. Cl. X.R.

328—150